No. 672,531. Patented Apr. 23, 1901.
G. C. HUNTER.
SEPARATOR.
(Application filed Aug. 25, 1900.)
(No Model.)

Witnesses:
R. J. Jacker.
John Manighan.

Inventor:
George C. Hunter
By Kummler
his Atty.

UNITED STATES PATENT OFFICE.

GEORGE C. HUNTER, OF CHICAGO, ILLINOIS, ASSIGNOR OF ONE-FOURTH TO JOHN MONIGHAN, OF SAME PLACE.

SEPARATOR.

SPECIFICATION forming part of Letters Patent No. 672,531, dated April 23, 1901.

Application filed August 25, 1900. Serial No. 27,973. (No model.)

*To all whom it may concern:*

Be it known that I, GEORGE C. HUNTER, a citizen of the United States of America, and a resident of Chicago, in the county of Cook and State of Illinois, have invented certain new and useful Improvements in Separators, of which the following is a specification.

The main object of my invention is to provide an improved device for separating oil and impurities from exhaust-steam and from ammonia-gas used in refrigerating-machines.

It will be understood that the device may be used in other connections for removing impurities from steam or gas.

The device hereinafter described is designed mainly for use on a refrigerating-machine, its purpose being to purify the exhaust-steam, which is afterward converted into distilled water. A similar device will be used for drying and removing the impurities from the ammonia-gas used in the process of refrigeration.

The particular objects of the different parts with which I put my invention into practice will be understood from the following description, with reference to the accompanying drawings, in which—

Figure 1:
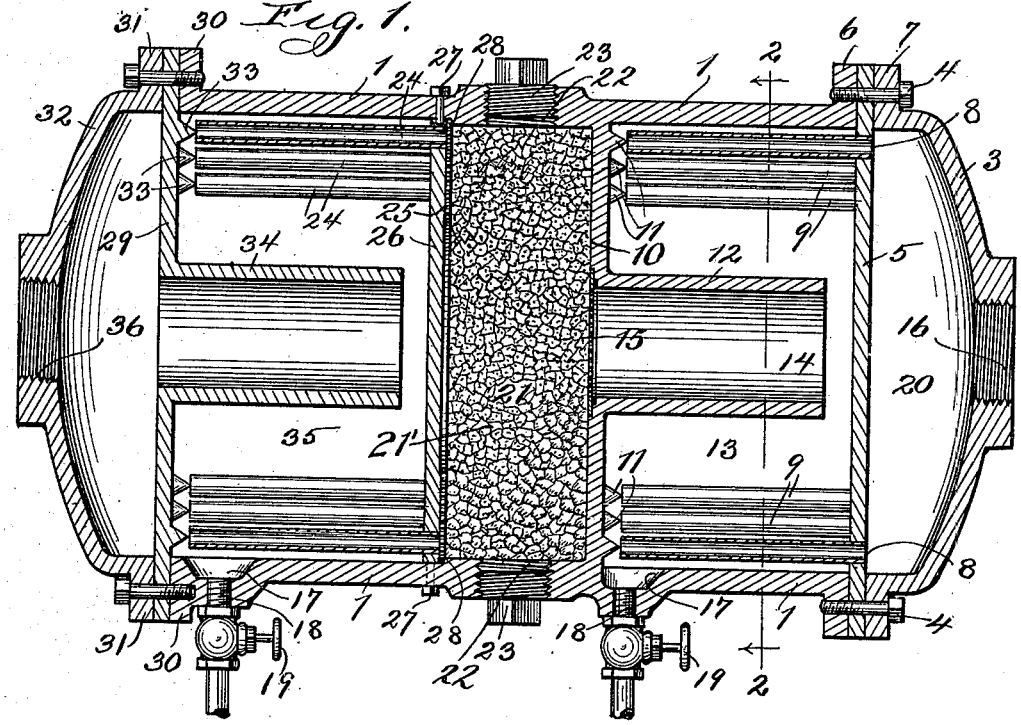
Figure 2:
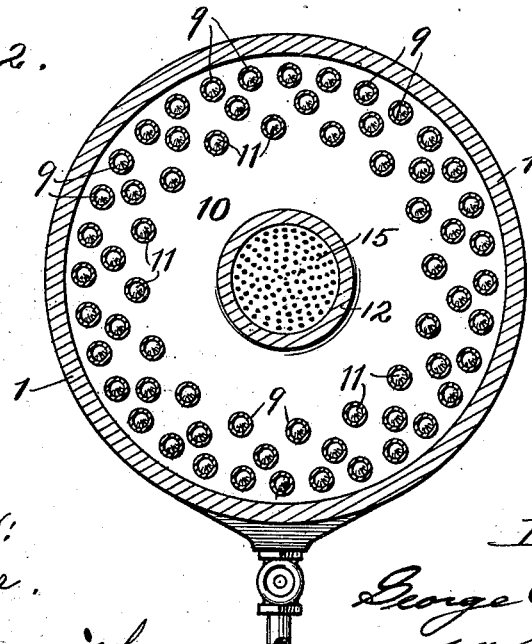

Figure 1 is a longitudinal section of a separator constructed according to my invention. Fig. 2 is a vertical section on the line 2 2.

In the form shown the casing 1 has the head secured to one end by the bolts 4. A plate or partition 5 is secured between flanges 6 and 7 of the casing 1 and head 3, respectively. The plate 5 has a series of perforations 8, in which the tubes 9 are seated. Said tubes extend toward the wall 10 of the casing. The wall 10 is provided with a series of conical projections 11, which are located immediately opposite the free ends of the tubes 9. Said projections are so disposed toward said tubes that same will break up or divide the jet of steam passing from each tube. The wall 10 has the neck 12 projecting into the chamber 13, in which the tubes 9 are located. The mouth 14 or the inlet end of the neck 12 is located near the partition 5 and considerably inward of the outlet end of the tube 9. A perforated partition or screen 15 is seated in the partition 10 and protects the passage through the neck 12. The head 3 has therein the inlet-port 16. The pocket 17 is formed in the wall of the casing 1 for collecting the oil and water which may be deposited by the steam and which may be drawn off through the port 18, controlled by the valve 19. The partition 5 divides the casing so as to separate the inlet-chamber 20 from the outlet-chamber 13 and cause the steam to pass from the chamber 20 into the chamber 13 only through the tubes 9. The casing 1 has therein the middle chamber 21, which is designed for containing coke or other suitable filtering matter 21'. The hand-holes 22 extend through the wall of the casing 1 and provide for access to the chamber 21 for supplying or removing the filtering matter. Said hand-holes are closed by the plugs 23. The outlet from the chamber 21 is through the tubes 24. Said outlet is protected by a perforated plate or screen 25. The parts shown in the left half of Fig. 1 are similar in structure to the corresponding parts hereinbefore described. The partition 26 is like the partition 5, except that same is held in position by means of the set-screws 27. The screen 25 is secured between the partition 26 and the shoulder 28 on the casing. The tubes 24 are in all respects similar to the tubes 8. The partition 29 is similar to the partition 10, except that the partition 29 is held between the flanges 30 and 31 of the casing 1 and head 32, respectively. The partition 29 is likewise provided with cones or projections 33, similar to the cones 11, and is also provided with a neck 34, similar to the neck 12. The steam passes from the chamber 35 through the neck 34 and outlet 36 of the head 32. A pocket 17, with outlet 18 and valve 19, is likewise provided for the chamber 35.

The operation of the device is as follows: The separator is suitably connected for receiving the exhaust-steam through a port 16. Said steam passes in the direction of the arrows through the tubes 9. The jet of steam from each of said tubes is broken up or divided by the projections 11. The oil and surplus water in the steam will be deposited on the surface of said projections, and when a sufficient quantity has accumulated to give the necessary weight to same it will collect at the bottom of the chamber 13 in the pocket 17. The same may there be drawn off through the port 18 by means of the valve 19. The steam passing from the outlet ends of the tubes 9 will also make some deposit of oil and water on the inner face of the partition 5. Said steam will then pass through the mouth 14 of the neck 12, thence through the screen 15, and into the filtering matter 21' in the chamber 21. The steam passes from the chamber 21 through the tubes 24, again making a deposit on the cones 23 and on the interior walls of the chamber 35, then passing out through the neck 34 and outlet-port 36. The oil and surplus water will likewise be collected at the bottom of the chamber 35 in the pocket 17, from which same may be drawn off in similar manner as before described.

When the device is used for ammonia, chlorid of calcium or other suitable filtering matter for drying the gas will be used in the chamber 21 instead of coke or like material.

It will be understood that one of my separators will be used on the ammonia side of a refrigerating-machine, while another will be connected with the exhaust-steam.

It will be seen that the parts in the chambers 13 and 35 are substantially duplicated and that the device may be made with only one of said chambers for use in merely removing oil and impurities from exhaust-steam.

It will be understood that the device may be used in vertical as well as horizontal position and that the details shown may be altered in various ways without departing from the spirit of my invention. I therefore do not confine myself to said details except as hereinafter limited in the claims.

What I claim as my invention, and desire to secure by Letters Patent, is—

1. A separator comprising a casing having a partition therein forming an inlet-chamber and an outlet-chamber; a series of tubes leading from said inlet-chamber through the partition and toward the opposite wall of the outlet-chamber; a series of projections on said opposite wall extending toward and in proximity to the outlet ends of said tubes; and an outlet-neck opening through said opposite wall, extending into said outlet-chamber, and having its mouth communicating with said outlet-chamber inward of the outlet ends of said tubes; substantially as described.

2. A separator comprising a casing having a partition therein forming an inlet-chamber and an outlet-chamber; a series of tubes leading from said inlet-chamber through the partition and toward the opposite wall of the outlet-chamber; a series of conical projections on said opposite wall, each having its apex extending toward and in proximity to the outlet end of one of said tubes; and an outlet-neck opening through said opposite wall, extending into said outlet-chamber, and having its mouth communicating with said outlet-chamber inward of the outlet ends of said tubes; substantially as described.

3. A separator comprising a casing having a partition therein forming an inlet-chamber and an outlet-chamber; a series of tubes leading from said inlet-chamber through the partition and toward the opposite wall of the outlet-chamber; an outlet-neck opening through said opposite wall extending into said outlet-chamber, and having its mouth communicating with said outlet-chamber inward of the outlet ends of said tubes; a screen in said neck; and a chamber containing filtering material outward of said screen, and communicating with said neck through said screen, and having an outlet-port; substantially as described.

4. A separator comprising a casing having a partition therein forming an inlet-chamber and an outlet-chamber; a series of tubes leading from said inlet-chamber through the partition and toward the opposite wall of the outlet-chamber; an outlet-neck opening through said opposite wall extending into said outlet-chamber, and having its mouth communicating with said outlet-chamber inward of the outlet ends of said tubes; a screen in said neck; a filter-chamber containing filtering material outward of said screen, and communicating with said neck through said screen; a second outlet-chamber, having a series of tubes leading into same from the filter-chamber, with a wall opposed to the outlet ends of said tubes and an outlet-neck opening through said wall, extending into said outlet-chamber, and having its mouth communicating with said second outlet-chamber inward of the outlet ends of said tubes; substantially as described.

5. A separator comprising a casing having a partition therein forming an inlet-chamber and an outlet-chamber; a series of tubes extending from said inlet-chamber into the outlet-chamber; a wall having a series of projections disposed opposite the outlet ends of said tubes and adapted to break or divide the jets of steam or gas leaving said tubes; said outlet-chamber having a discharge-port communicating therewith at a place inward of the outlet ends of said tubes and in position to discharge the steam or gas only after same has been divided by said projections, and backed up from said wall; substantially as described.

Signed at Chicago, Illinois, this 20th day of August, 1900.

GEORGE C. HUNTER.

Witnesses:
 WM. R. RUMMLER,
 ALICE DICK.